(12) United States Patent
Huang

(10) Patent No.: US 6,783,140 B1
(45) Date of Patent: Aug. 31, 2004

(54) BICYCLE FRONT FORK VIBRATION-PROOF STRUCTURE

(76) Inventor: Bill Huang, 235 Chung-Ho Box 8-24, Taipei (TW)

( * ) Notice: Subject to any disclaimer, the term of this patent is extended or adjusted under 35 U.S.C. 154(b) by 0 days.

(21) Appl. No.: 10/638,895

(22) Filed: Aug. 12, 2003

(51) Int. Cl.$^7$ ................................................ B62K 21/20
(52) U.S. Cl. ...................................................... 280/276
(58) Field of Search ................................ 280/275, 276, 280/277; 267/292

(56) References Cited

U.S. PATENT DOCUMENTS

| | | | | |
|---|---|---|---|---|
| 913,961 A | * | 3/1909 | Levedahl | 280/276 |
| 2,756,070 A | * | 7/1956 | Torre | 280/276 |
| 3,083,038 A | * | 3/1963 | Moulton | 280/276 |
| 4,576,393 A | * | 3/1986 | Moulton et al. | 280/276 |
| 5,310,203 A | * | 5/1994 | Chen | 280/276 |
| 5,462,302 A | * | 10/1995 | Leitner | 280/277 |
| 5,749,590 A | * | 5/1998 | Roerig | 280/276 |

* cited by examiner

Primary Examiner—Kevin Hurley

(57) ABSTRACT

A bicycle front fork vibration-proof structure comprises a front fork tube and a vibration-proof device. The front fork tube is formed by a biforked tube and a front-fork stand tube which are separated from one another. The vibration-proof device is installed between the biforked tube and the front-fork stand tube. The pivotal linkage unit is pivotally installed to a first pivotal portion at an outer edge of the connecting tube and another end thereof is pivotally connected to the axial vibration absorption unit. The axial vibration absorption unit is firmly secured to an inner edge of the front-fork stand tube. The concave washer is installed on the vibration absorption body for resisting and positioning a connecting tube of a handle of a tube which has been engaged to the front-fork stand tube. Thereby, the vibration-proof effect of a bicycle is improved and the brake suspending frame can be installed easily.

5 Claims, 5 Drawing Sheets

US 6,783,140 B1

BICYCLE FRONT FORK VIBRATION-PROOF STRUCTURE

FIELD OF THE INVENTION

The present invention relates to bicycles, and particularly to a bicycle front fork vibration-proof structure.

BACKGROUND OF THE INVENTION

Referring to FIG. 1, a prior art bicycle vibration-proof structure is illustrated. The vibration structure is installed in front of one end of a Y shape biforked connecting tube of a front biforked tube. In this prior art structure, the vibration-proof parts, such as springs, positioning screw rods, etc., are installed in the biforked connecting tube so that the assembly work can not be performed easily. Moreover, in the prior art, two sets of vibration-proof structures are installed in a front biforked tube so that the vibration-proof effect is not preferred. Thus forces applied to two sides of the biforked connecting tube are not balanced. This also occurs in braking the bicycle. Therefore, the suspending frame for controlling the action of brake is installed at two sides of the biforked connecting tube at positions corresponding to the two vibration-proof structures, and thus at two sides of the wheel rim of a bicycle so as to reduce the force-unbalance to a minimum value. Thus not only the position for installing the suspending frame is confined, but also the ability for reducing the unbalance of applied force is limited. Thereby, the prior art design is not a preferred design.

SUMMARY OF THE INVENTION

Accordingly, the primary object of the present invention is to provide a bicycle front fork vibration-proof structure which comprises a front fork tube and a vibration-proof device. The front fork tube is formed by a biforked tube and a front-fork stand tube which are separated from one another. The vibration-proof device is installed between the biforked tube and the front-fork stand tube. The pivotal linkage unit is pivotally installed to a first pivotal portion at an outer edge of the connecting tube and another end thereof is pivotally connected to the axial vibration absorption unit. The axial vibration absorption unit is firmly secured to an inner edge of the front-fork stand tube. The concave washer is installed on the vibration absorption body for resisting and positioning a connecting tube of a handle of a tube which has been engaged to the front-fork stand tube. Thereby, the vibration-proof effect of a bicycle is improved and the brake suspending frame can be installed easily.

The various objects and advantages of the present invention will be more readily understood from the following detailed description when read in conjunction with the appended drawing.

DETAILED DESCRIPTION OF THE PREFERRED EMBODIMENTS

Figure 1:
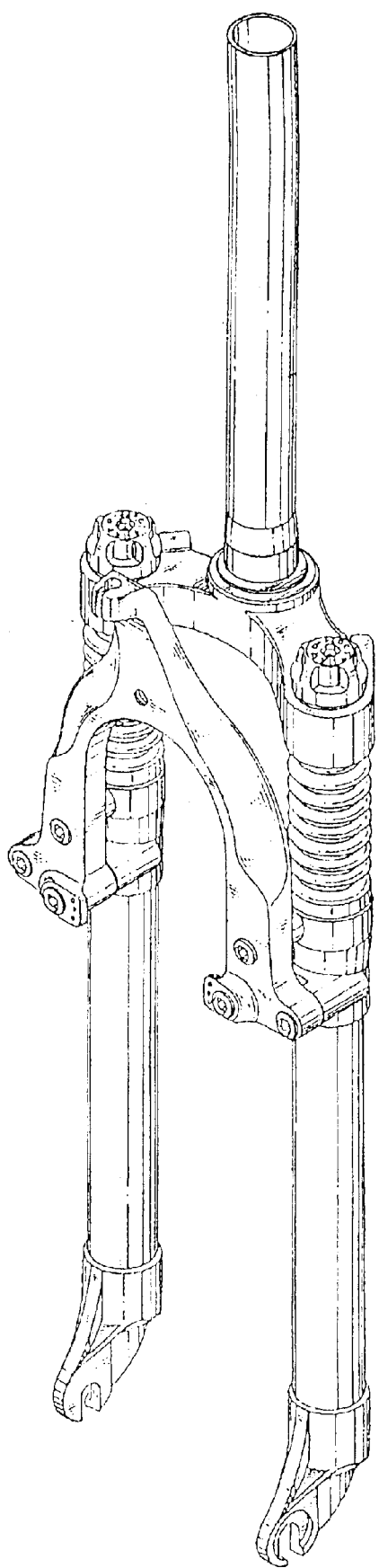
FIG. 1 is a schematic perspective view of the prior art design.
Figure 2:
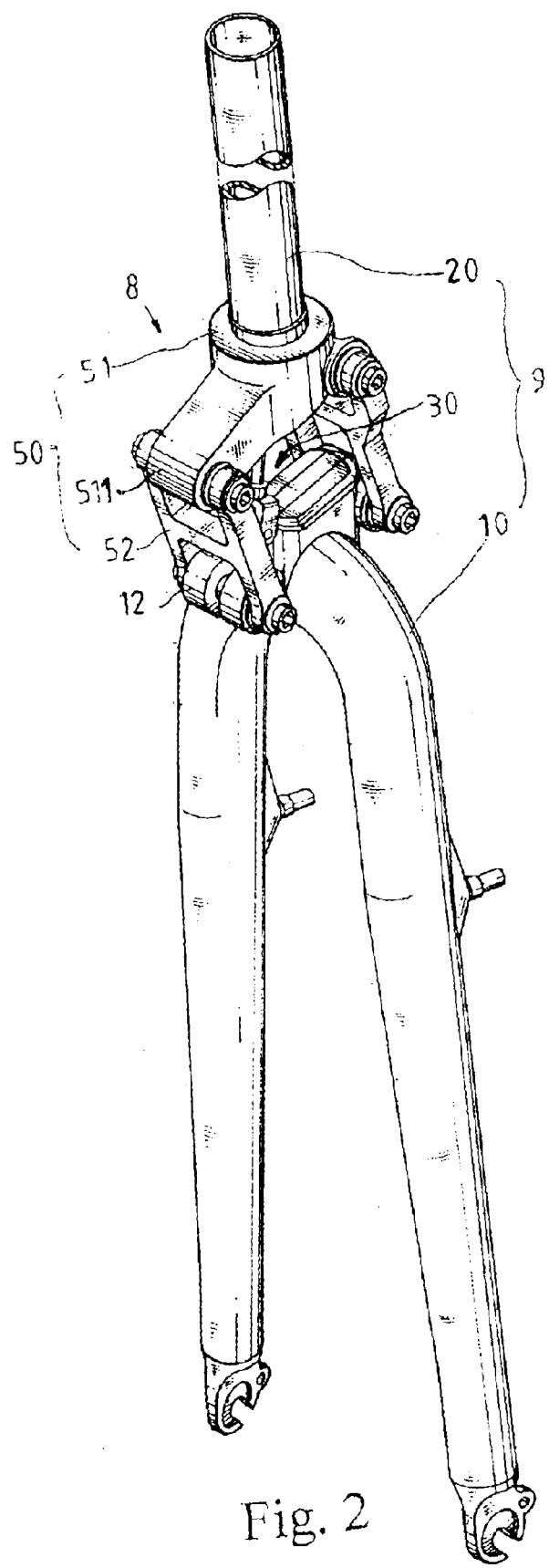
FIG. 2 is a schematic perspective view of the present invention.
Figure 3:
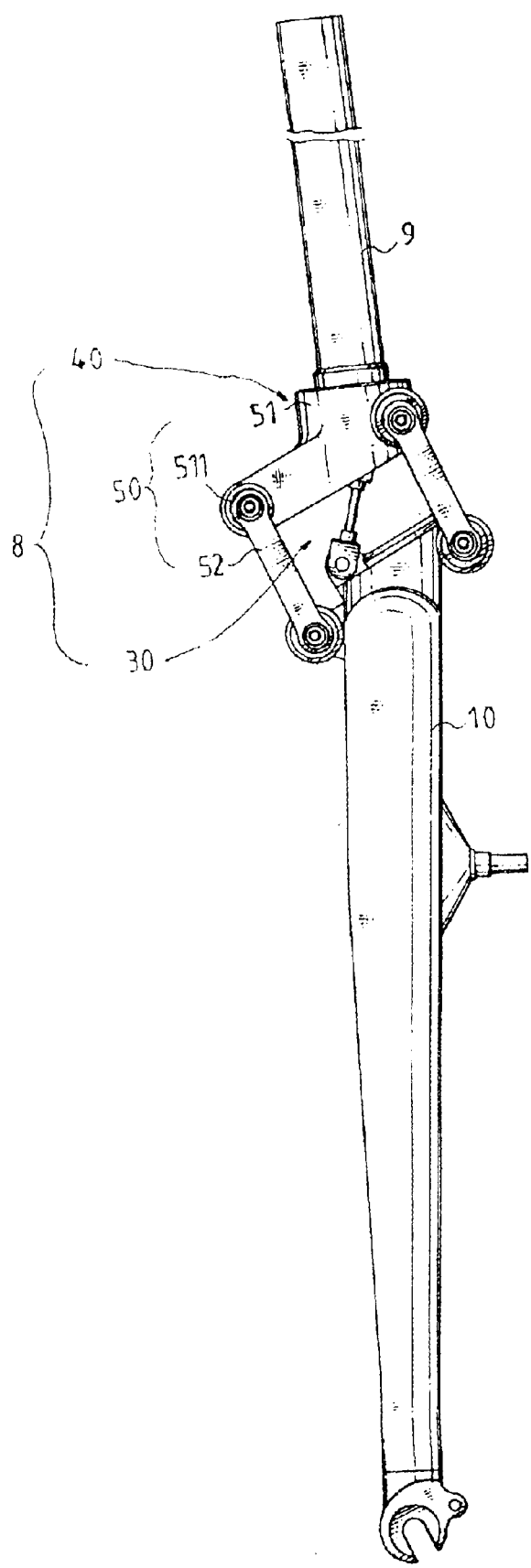
FIG. 3 is a plane assembly view of the present invention.
Figure 4:
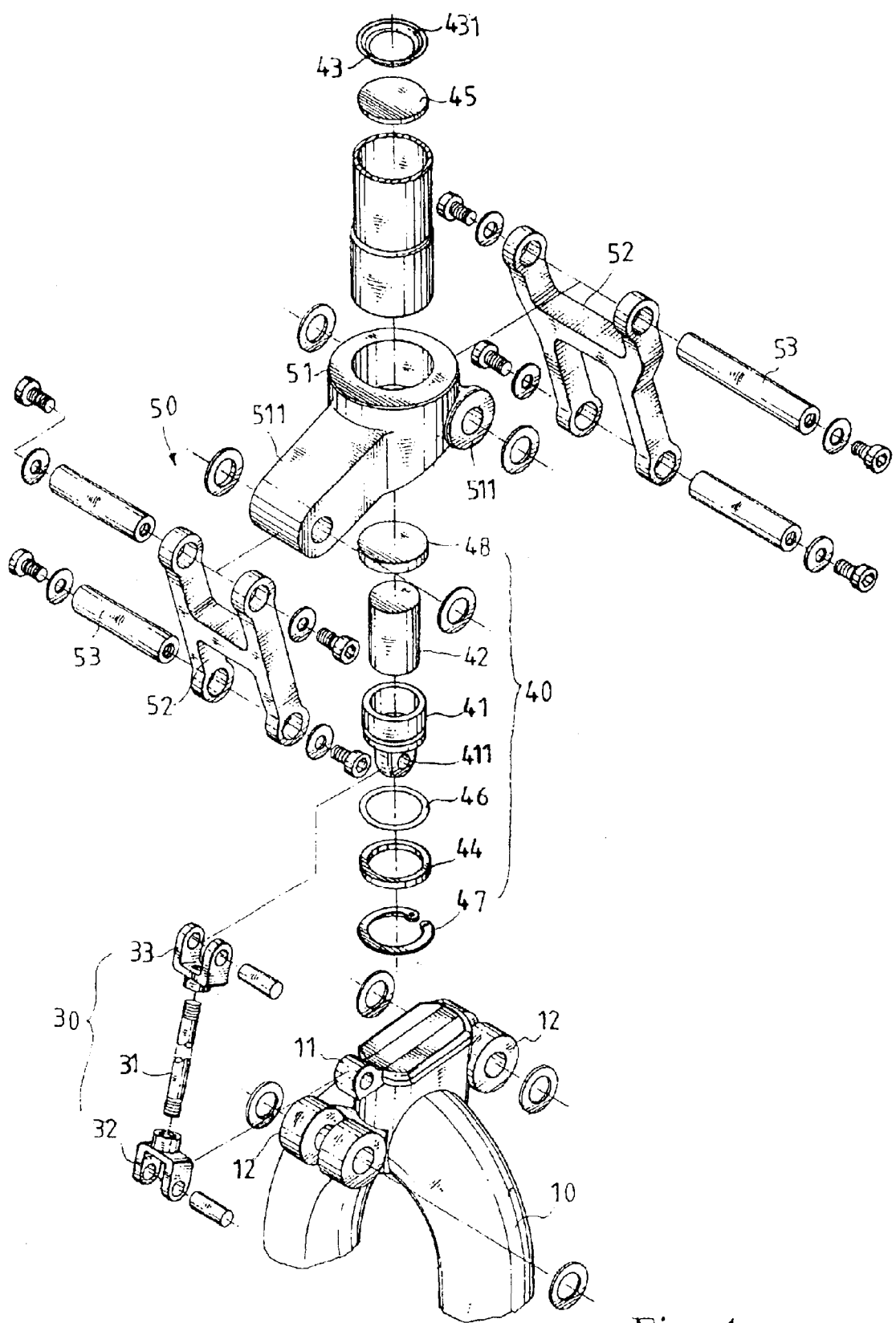
FIG. 4 is an exploded schematic view of the present invention.
Figure 5:
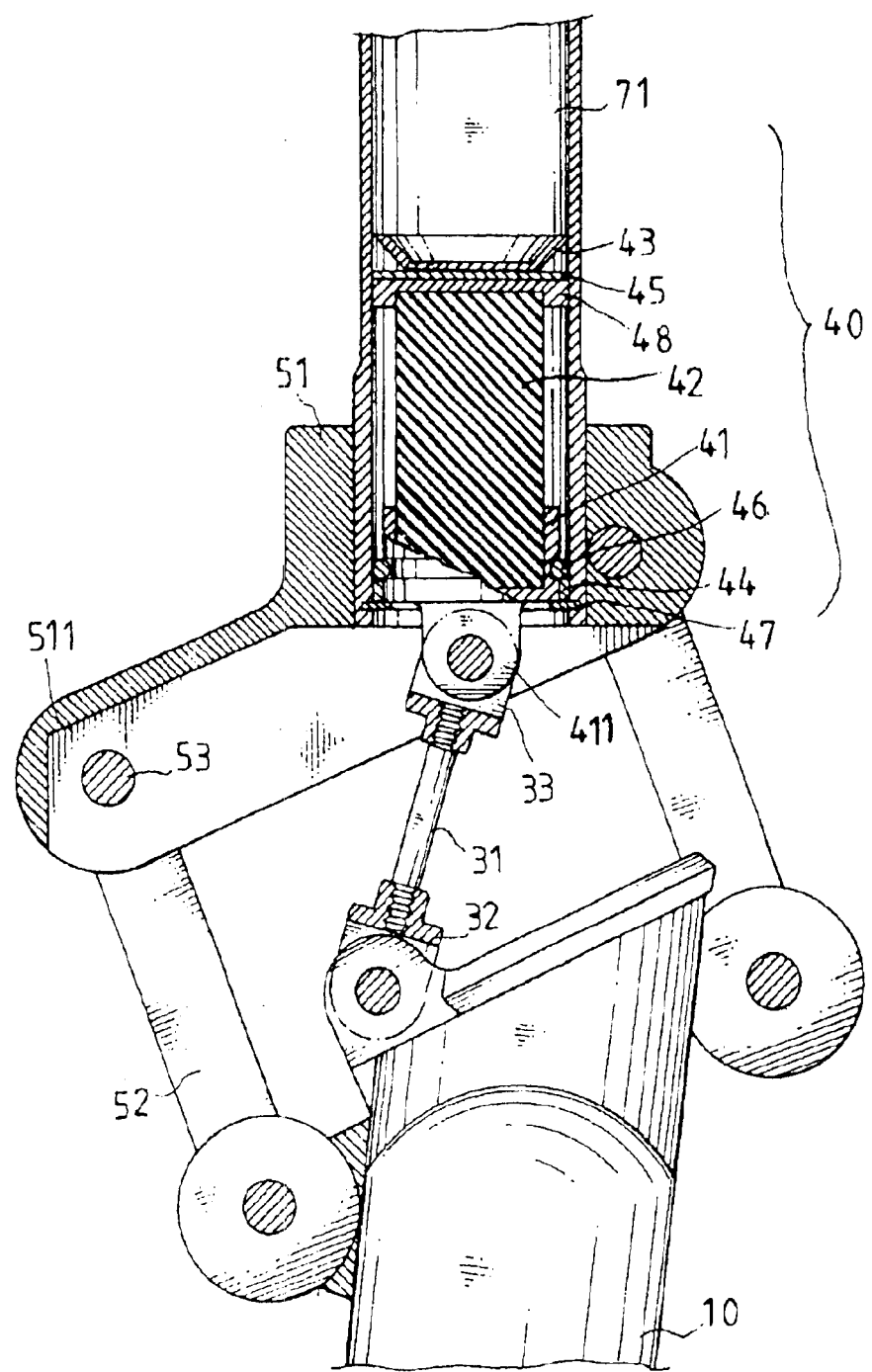
FIG. 5 is a schematic cross section view of the present invention.

Referring to FIGS. 2 to 5, the bicycle front fork vibration-proof structure of the present invention is illustrated. The bicycle front fork vibration-proof structure includes a front fork tube 9 and a vibration-proof device 8 installed above the front fork tube 9.

The front fork tube 9 has an approximate Y shape. The front fork tube 9 is formed by a biforked tube 10 and a front-fork stand tube 20 which are separated from one another. One end of the biforked tube 10 is assembled with a front wheel (not shown) of a bicycle, and another end thereof is protruded with a first pivotal portion 11 and two parallel third pivotal portions 3. One end of the front-fork stand tube 20 serves to assemble the connecting tube 71 of the handle of a bicycle and another end thereof is installed with the vibration-proof device 8.

The vibration-proof device 8 is installed between the biforked tube 10 and the front-fork stand tube 20. The vibration-proof device 8 is formed by a pivotal linkage unit 30, an axial vibration absorption unit 40, and an auxiliary buffer linkage unit 50.

The pivotal linkage unit 30 is formed by a long straight axial rod 31 and two U shape pivotal units 32, 33. The two pivotal units 32, 33 are screwedly connected to the two ends of the axial rod 31. The first pivotal unit 32 is pivotally and obliquely connected to the first pivotal portion 11 on the biforked tube 10, and the second pivotal unit 33 is pivotally and obliquely connected to the second pivotal portion 411 of the axial vibration absorption unit 40. Thereby, when the front fork tube 9 vibrates, a movement for buffering the vibration is generated.

The axial vibration absorption unit 40 is formed by an axial connector 41, a vibration absorption body 42, a concave washer 43, a first and a second elastomers 44, 45, and a cover 48. The axial connector 41 is a hollow tube with a protruding second pivotal portion 411, and an elastic ring 46 enclosing the axial connector 41. A C ring 47 is firmly secured to an inner side of the front-fork stand tube 20. The first elastomer 44 is installed between the axial connector 41 and the front-fork stand tube 20. The axial connector 41 is hollowed for receiving the vibration absorption body 42. The cover 48 covers, the axial connector 41. An outer edge of the axial connector 41 with respect to the biforked tube 10 is protruded with a second pivotal portion 411 for pivotally connecting the second pivotal unit 33 of the pivotal linkage unit 30. Moreover, the second elastomer 45 is formed as a pad and the concave washer 43 has a slightly cambered shape and is formed with a tapered through hole 431. The second elastomer 45 and the concave washer 43 are installed above the cover 48. The connecting tube 71 exactly resists against the tapered through hole 431 of the concave washer 43.

The auxiliary buffer linkage unit 50 is formed by a pivotal connecting unit 51, two H shape linkages 52, and a plurality of pivotal tubes 53. The pivotal connecting unit 51 is a sleeve and can be engaged to the front-fork stand tube 20 at an end of the front-fork stand tube 20 for receiving the axial connector 41. The auxiliary buffer linkage unit 50 is extended with two fourth pivotal portions 411 at opposite positions for pivotally connecting one ends of the two linkages 52 by using respective pivotal tubes 53. Another end of each linkage 52 is pivotally connected to the third pivotal portion 12 on the biforked tube 10 through a pivotal tube 53 for increasing the vibration-proof effect of the bicycle.

Thereby, by above structure, when the bicycles brake, the vibration force is transferred longitudinally. In the vibration process, the vibration force will apple to the axial vibration absorption unit 40 instead of being transferred to the handle of the bicycle directly. Then, the vibration force is reduced by the pivotal linkage unit 30 and the auxiliary buffer linkage unit 50. Since the axial vibration absorption unit 40, the pivotal linkage unit 30 and the auxiliary buffer linkage unit 50 have the effect of vibration buffer and absorption, the bicycle front fork vibration-proof effect is improved greatly. Moreover, since the vibration-proof device 8 is only installed between the biforked tube 10 and the front-fork stand tube 20, the defect of the prior art can be improved greatly. Meanwhile, the, position for installing a suspending frame (not shown) of a bicycle is not confined. Thus the assembly of a bicycle can be simplified.

The present invention is thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A bicycle front fork vibration-proof structure comprising a front fork tube and a vibration-proof device; the front fork tube being formed by a biforked tube and a front-fork stand tube; one end of the biforked tube being assembled with a front wheel of a bicycle; the front-fork stand tube being assembled to a connecting tube of a bicycle handle; wherein the biforked tube and the front-fork stand tube are separated from one another; the vibration-proof device is installed between the biforked tube and the front-fork stand tube; the vibration-proof device is formed by a pivotal linkage unit, and an axial vibration absorption unit;

one end of the pivotal linkage unit is pivotally installed to a first pivotal portion at an outer edge of the connecting tube and another end thereof is pivotally connected to the axial vibration absorption unit; the axial vibration absorption unit is firmly secured to an inner edge of the front-fork stand tube by a C ring;

the axial vibration absorption unit is formed by an axial connector, at least one vibration absorption body, and a concave washer;

one end of the axial connector is protruded with a second pivotal portion for pivotally connecting the pivotal linkage unit; and an inner edge of the axial connector being installed with the vibration absorption body; and the concave washer is installed on the vibration absorption body for resisting and positioning a connecting tube of a handle of a tube which has been engaged to the front-fork stand tube;

thereby, the vibration-proof effect of a bicycle is improved and the brake suspending frame can be installed easily.

2. The bicycle front fork vibration-proof structure as claimed in claim 1, wherein a pivotal linkage unit is formed by an axial rod and a first and a second pivotal units; the first and second pivotal units are screwedly connected to the two ends of the axial rod; the first pivotal unit is pivotally connected to the first pivotal portion on the biforked tube, and the second pivotal unit is pivotally connected to the second pivotal portion of the axial vibration absorption unit; thereby, when the front fork tube vibrates, a movement for buffering the vibration is generated.

3. The bicycle front fork vibration-proof structure as claimed in claim 1, wherein a first elastomer is installed between the axial connector and a front-fork stand tube after the axial connector is firmly secured to the front-fork stand tube.

4. The bicycle front fork vibration-proof structure as claimed in claim 1, wherein when the vibration absorption body is installed in the axial connector; a cover covers upon a top of the vibration absorption body; and a second elastomer is installed between the cover and the concave washer.

5. The bicycle front fork vibration-proof structure as claimed in claim 1, further comprising an auxiliary buffer linkage unit; wherein the auxiliary buffer linkage unit is formed by a pivotal connecting unit, two linkages, and a plurality of pivotal tubes; the pivotal connecting unit is engaged to the front-fork stand tube at an end of the front-fork stand tube for receiving the axial connector; the auxiliary buffer linkage unit is extended with two fourth pivotal portions at opposite positions for pivotally connecting one ends of the two linkages by using respective pivotal tubes; another end of each linkage is pivotally connected to the third pivotal portion on the biforked tube through a pivotal tube for increasing the vibration-proof effect of the bicycle.

* * * * *